(12) United States Patent  
Yoon

(10) Patent No.: US 9,851,903 B2  
(45) Date of Patent: Dec. 26, 2017

(54) SEMICONDUCTOR DEVICES AND SEMICONDUCTOR SYSTEMS INCLUDING THE SAME

(71) Applicant: SK hynix Inc., Icheon-si, Gyeonggi-do (KR)

(72) Inventor: Young Jun Yoon, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 326 days.

(21) Appl. No.: 14/690,604

(22) Filed: Apr. 20, 2015

(65) Prior Publication Data

US 2016/0179377 A1 Jun. 23, 2016

(30) Foreign Application Priority Data

Dec. 23, 2014 (KR) .......................... 10-2014-0187490

(51) Int. Cl.
*G06F 3/06* (2006.01)
*G06F 13/16* (2006.01)

(52) U.S. Cl.
CPC ............. *G06F 3/061* (2013.01); *G06F 3/0604* (2013.01); *G06F 3/0634* (2013.01); *G06F 3/0673* (2013.01); *G06F 13/1673* (2013.01)

(58) Field of Classification Search
CPC ...... G06F 3/061; G06F 3/0604; G06F 3/0634; G06F 3/0673; G06F 13/1673
See application file for complete search history.

(56) References Cited

U.S. PATENT DOCUMENTS

2012/0131244 A1 5/2012 Abbasfar
2013/0339641 A1* 12/2013 Ok .................... G06F 12/0646
                                                          711/158

FOREIGN PATENT DOCUMENTS

KR  1020130139633 A  12/2013

* cited by examiner

*Primary Examiner* — Eric S Cardwell
(74) *Attorney, Agent, or Firm* — William Park & Associates Ltd.

(57) ABSTRACT

A semiconductor system includes a controller and a semiconductor device. The controller generates command signals, a composite control signal, and data signals. The semiconductor device generates a first mode signal and a second mode signal according to the command signals. The semiconductor device includes a write control circuit suitable for receiving the composite control signal and the data signals to determine an execution/non-execution of a data masking operation and a data bus inversion (DBI) operation when a write operation or a masking write operation is performed according to the first and second mode signals.

32 Claims, 13 Drawing Sheets

FIG.11

| SOSEBWT | Burst Sequence | |
|---|---|---|
| L | D_SEL1<1:M> | D_SEL2<1:M> |
| H | D_SEL2<1:M> | D_SEL1<1:M> |

FIG.12

| M_DM | M_WDBI | WRITE OPERATION | MASK WRITE OPERATION |
|---|---|---|---|
| L | L | RX_EN="L" | RX_EN="L", MWT="L" |
| L | H | DBI OPERATION | MWT="L" |
| H | L | DRV_CON="H" | WDMI=DMI |
| H | H | DBI OPERATION | DMI="H"→S_CON="H"<br>WDMI=PD_COM |

SEMICONDUCTOR DEVICES AND SEMICONDUCTOR SYSTEMS INCLUDING THE SAME

CROSS-REFERENCE TO RELATED APPLICATION

The present application claims priority under 35 U.S.C 119(a) to Korean Application No. 10-2014-0187490, filed on Dec. 23, 2014, in the Korean Intellectual Property Office, which is incorporated herein by reference in its entirety as set forth in full.

BACKGROUND

1. Technical Field

Embodiments of the invention relate to semiconductor devices and semiconductor systems including the same.

2. Related Art

In a semiconductor system including a controller and a semiconductor device, a read operation or a write operation may be performed by transmission of data between the controller and the semiconductor device. During the read operation, data stored in the semiconductor device may be transmitted to the controller. During the write operation, data outputted from the controller may be transmitted to the semiconductor device and may be stored in a storage unit of the semiconductor device. A data masking operation may be used to store only desired bits among bits of the data outputted from the controller into the storage unit of the semiconductor device. That is, if the data masking operation is performed, the semiconductor system may store only desired bits among the data outputted from the controller in the semiconductor device. In order that the data masking operation is performed in the semiconductor system, a data masking signal including information on data to be masked should be transmitted together with the data from the controller to the semiconductor device.

Meanwhile, if the number of data bits whose phases are changed when the data are transmitted in the semiconductor system increases, a simultaneous switching noise (SSN) phenomenon and an inter-symbol interface (ISI) phenomenon may occur more frequently. Recently, a data bus inversion (DBI) scheme has been used to suppress the SSN phenomenon and the ISI phenomenon. If data outputted from the controller are transmitted to the semiconductor using the DBI scheme, the data have to be transmitted together with a DBI signal including information on whether the data are inverted.

SUMMARY

According to an embodiment, a semiconductor system includes a controller and a semiconductor device. The controller generates command signals, a composite control signal, and data signals. The semiconductor device generates a first mode signal and a second mode signal according to the command signals. The semiconductor device includes a write control circuit suitable for receiving the composite control signal and the data signals to determine an execution/non-execution of a data masking operation and a data bus inversion (DBI) operation when a write operation or a masking write operation is performed according to the first and second mode signals.

According to an embodiment, a semiconductor device includes a command decoder, a mode signal generator, and a write control circuit. The command decoder decodes command signals to generate a write command signal for a write operation, a masking write command signal for a masking write operation, and a mode register write command signal. The mode signal generator receives the mode register write command signal to generate a first mode signal and a second mode signal from the command signals. In addition, the mode signal generator stores the first and second mode signals and outputs the first and second mode signals. The write control circuit receives a composite control signal and data signals to determine an execution/non-execution of a data masking operation and a data bus inversion (DBI) operation when the write operation or the masking write operation is performed according to the first and second mode signals.

In an embodiment of the invention, a semiconductor system includes a controller and a semiconductor device. The controller is configured to transmit command signals, address signals, data signals, and a composite control signal. The semiconductor device is configured to receive the command signals, the address signals, the data signals, and the composite control signal and to generate a first mode signal and a second mode signal. The semiconductor device includes a write control circuit configured to receive the composite control signal and the data signals to execute a data masking operation or a data bus inversion (DBI) operation or both the data masking operation and the DBI operation.

BRIEF DESCRIPTION OF THE DRAWINGS

FIG. 11 is a table illustrating an operation of an output sequence controller included in the second output unit of FIG. 10;

FIG. 12 is a table illustrating an operation of the semiconductor system shown in FIG. 1.

DETAILED DESCRIPTION

Various embodiments of the invention will be described hereinafter with reference to the accompanying figures. However, the embodiments described are for illustrative purposes only and are not intended to limit the scope of the invention.

Figure 1:
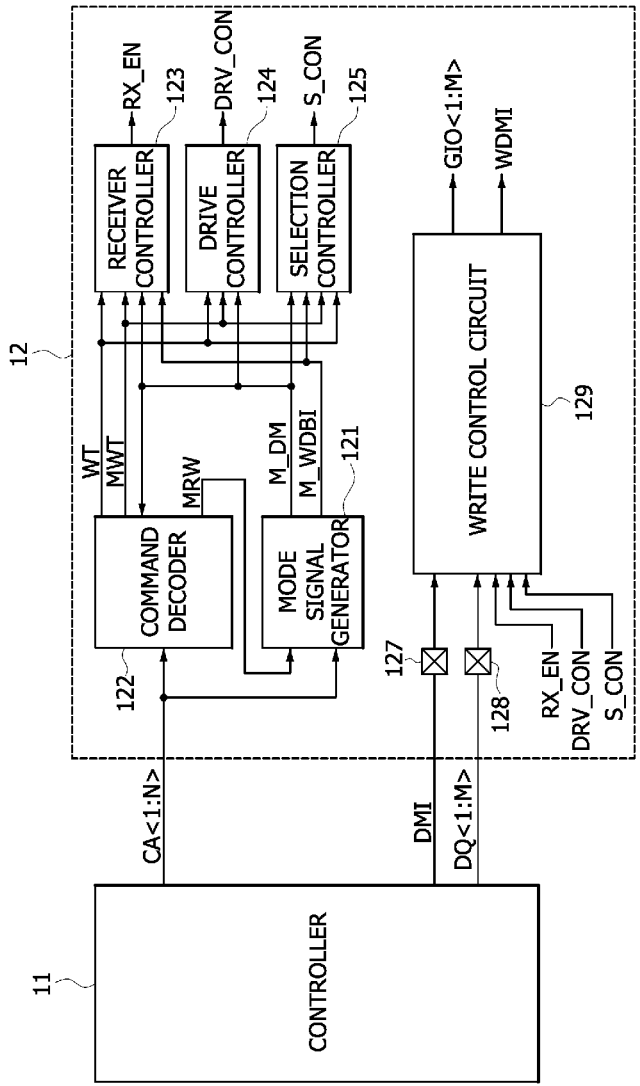
FIG. 1 is a block diagram illustrating a semiconductor system according to an embodiment.

Referring to FIG. 1, a semiconductor system according to an embodiment may include a controller 11 and a semiconductor device 12. The semiconductor device 12 may include a mode signal generator 121, a command decoder 122, a receiver controller 123, a drive controller 124, a selection controller 125, a pad 127, a data pad 128 and a write control circuit 129.

The controller 11 may apply command/address signals CA<1:N>, a composite control signal DMI and data signals DQ<1:M> to the semiconductor device 12. The command/address signals CA<1:N> may include command signals and address signals. In the command/address signals CA<1:N>, one of the command signals and the corresponding one of the address signals may be transmitted through the same transmission line in synchronization with an external clock signal. The composite control signal DMI may include information on a data masking operation and a DBI operation. The data signals DQ<1:M> may include M-number of bits. Although FIG. 1 illustrates an example that the data signals DQ<1:M> are transmitted through a single line, the M-number of bits included in the data signals DQ<1:M> may actually be transmitted in parallel through M-number of lines, respectively. If a burst operation is performed, a plurality sets of data signals DQ<1:M> may be sequentially inputted to the semiconductor device 12. Hereinafter, the plurality sets of data signals DQ<1:M> sequentially inputted during the burst operation will be expressed by DQ1<1:M>, DQ2<1:M>, . . . , and DQN<1:M> accordingly. Moreover, a detailed description of the controller 11 may will be developed with reference to FIG. 13 described below.

The mode signal generator 121 may receive a mode register write command signal MRW to generate a first mode signal M_DM and a second mode signal M_WDBI from the command/address signals CA<1: N>. The mode signal generator 121 may include a plurality of storage media such as registers to store the first mode signal M_DM and the second mode signal M_WDBI therein. The mode signal generator 121 may output the first mode signal M_DM and the second mode signal M_WDBI. The first mode signal M_DM may be enabled to execute the data masking operation. Further, the second mode signal M_WDBI may be enabled to execute the DBI operation.

The command decoder 122 may decode command signals included in the command/address signals CA<1: N> to generate a write command signal WT, a masking write command signal MWT and the mode register write command signal MRW. The write command signal WT may be generated to execute the write operation. Further, the masking write command signal MWT may be generated to execute a masking write operation. The mode register write command signal MRW may be generated to execute an operation that the mode signal generator 121 extracts the first and second mode signals M_DM and M_WDBI from the command/address signals CA<1: N> and stores the first and second mode signals M_DM and M_WDBI therein. The command decoder 122 may terminate generation of the masking write command signal MWT if the first mode signal M_DM is disabled. This may be because it is unnecessary to generate the masking write command signal MWT if the masking write operation is not performed.

The receiver controller 123 may generate a receiver control signal RX_EN according to the write command signal WT, the masking write command signal MWT, the first mode signal M_DM and the second mode signal M_WDBI. The receiver controller 123 may generate the receiver control signal RX_EN which is disabled if the write operation or the masking write operation is performed while the first and second mode signals M_DM and M_WDBI are disabled. The receiver controller 123 may generate the receiver control signal RX_EN enabled if the write operation or the masking write operation is performed while at least one of the first and second mode signals M_DM and M_WDBI is enabled. A logic level of the receiver control signal RX_EN enabled or disabled may be set to be different according to various embodiments.

The drive controller 124 may generate a drive control signal DRV_CON according to the write command signal WT, the masking write command signal MWT and the first mode signal M_DM. The drive controller 124 may generate the drive control signal DRV_CON enabled if the write operation is performed while the first mode signal M_DM is enabled. The drive controller 124 may generate the drive control signal DRV_CON enabled to terminate generation of an internal data masking signal WDMI while the write operation is performed without the data masking operation and when the second mode signal M_WDBI is disabled. A logic level of the drive control signal DRV_CON enabled may be set to be different according to various embodiments.

The selection controller 125 may generate a selection control signal S_CON according to the write command signal WT, the masking write command signal MWT, the first mode signal M_DM and the second mode signal M_WDBI. The selection controller 125 may generate the selection control signal S_CON which is enabled to selectively execute the data masking operation or the DBI operation according to a phase variation of the data signals DQ<1:M> sequentially inputted to the semiconductor device 12 if the write operation or the masking write operation is performed while the first and second mode signals M_DM and M_WDBI are enabled. The selection controller 125 may generate the selection control signal S_CON which is disabled to selectively execute the data masking operation or the DBI operation according to the composite control signal DMI if the write operation or the masking write operation is performed while at least one of the first and second mode signals M_DM and M_WDBI is disabled. A logic level of the selection control signal S_CON enabled or disabled may be set to be different according to various embodiments.

The write control circuit 129 may receive the composite control signal DMI through the pad 127. The write control circuit 120 may also receive the data signals DQ<1:M> through the data pad 128. The data pad 128 may include the same number of pads as the bits of the data signals DQ<1:M>. The write control circuit 129 may receive the composite control signal DMI and the data signals DQ<1:M> according to the receiver control signal RX_EN, the drive control signal DRV_CON and the selection control signal S_CON to execute the data masking operation and/or the DBI operation. Moreover, the write control circuit 129 may determine an execution or a non-execution of a data masking operation and a DBI operation when a write operation or a masking write operation is performed in response to the first and second mode signals M_DM and M_WDBI, respectively. The control circuit 129 may selectively execute the data masking operation or the DBI operation according to phase variations of the data signals sequentially outputted from the controller 12 if the first mode signal M_DM, second mode signal M_WDBI and the composite control signal DMI are enabled. A detailed configuration and a detailed operation of the write control circuit 129 will be described with reference to FIGS. 4 to 12 below.

Figure 2:
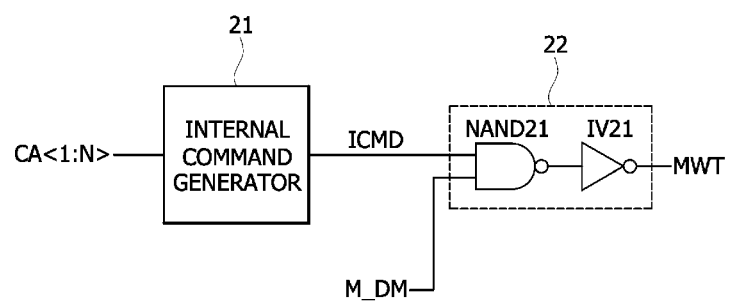
FIG. 2 is a block diagram illustrating a command decoder included in the semiconductor system of FIG. 1.

Referring to FIG. 2, the command decoder 122 may include an internal command generator 21 and a command output unit 22. The internal command generator 21 may decode the command signals included in the command/ address signals CA<1: N> to generate an internal command signal ICMD. The internal command signal ICMD may be extracted from the command/address signals CA<1: N> to execute the masking write operation. The command output unit 22 may include a NAND gate NAND21 employing the internal command signal ICMD and the first mode signal M_DM as input signals. Further the command output unit 22 may include an inverter IV21 employing an output signal of the NAND gate NAND21 as an input signal. The command output unit 22 may generate the masking write command signal MWT from the internal command signal ICMD according to the first mode signal M_DM. More specifically, the command decoder 122 may generate the masking write command signal MWT which is enabled to have a logic "high" level for execution of the data masking operation if the first mode signal M_DM is enabled to have a logic "high" level. In contrast, the command decoder 122 may generate the masking write command signal MWT which is disabled to have a logic "low" level for termination of the data masking operation if the first mode signal M_DM is disabled to have a logic "low" level. The command decoder 122 of FIG. 2 illustrates only a portion that generates the masking write command signal MWT. The command decoder 122 generating all of the write command signal WT, masking write command signal MWT and the mode register write command signal MRW may be realized using a general circuit.

Figure 3:
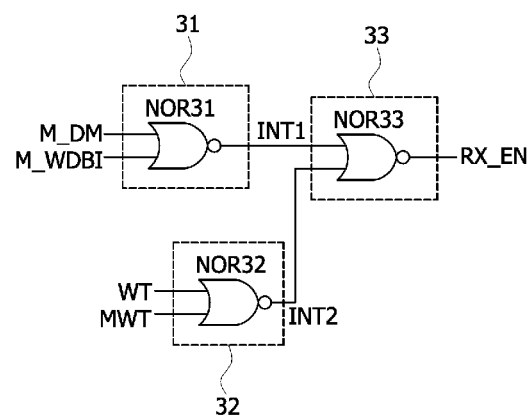
FIG. 3 is a logic circuit diagram illustrating a receiver controller included in the semiconductor system of FIG. 1.

Referring to FIG. 3, the receiver controller 123 may include a first internal signal generator 31, a second internal signal generator 32 and an internal signal synthesizer 33. The first internal signal generator 31 may be realized using a NOR gate NOR31. The first internal signal generator 31 may execute a NOR operation of the first mode signal M_DM and the second mode signal M_WDBI to generate a first internal signal INT1. The first internal signal INT1 may be generated to have a logic "high" level if both of the first and second mode signals M_DM and M_WDBI are disabled to have a logic "low" level. The first internal signal INT1 may be generated to have a logic "low" level if at least one of the first and second mode signals M_DM and M_WDBI is enabled to have a logic "high" level. The second internal signal generator 32 may be realized using a NOR gate NOR32. The second internal signal generator 32 may execute a NOR operation of the write command signal WT and the masking write command signal MWT to generate a second internal signal INT2. The second internal signal INT2 may be generated to have a logic "low" level if at least one of the write command signal WT and the masking write command signal MWT has a logic "high" level. The internal signal synthesizer 33 may be realized using a NOR gate NOR33. The internal signal synthesizer 33 may execute a NOR operation of the first and second internal signals INT1 and INT2 to generate the receiver control signal RX_EN. The receiver controller 123 may generate the receiver control signal RX_EN which is disabled to have a logic "low" level if the write operation or the masking write operation is performed while both of the first and second mode signals M_DM and M_WDBI are disabled to have a logic "low" level. The receiver controller 123 may generate the receiver control signal RX_EN enabled to have a logic "high" level if the write operation or the masking write operation is performed while at least one of the first and second mode signals M_DM and M_WDBI is enabled to have a logic "high" level.

Figure 4:
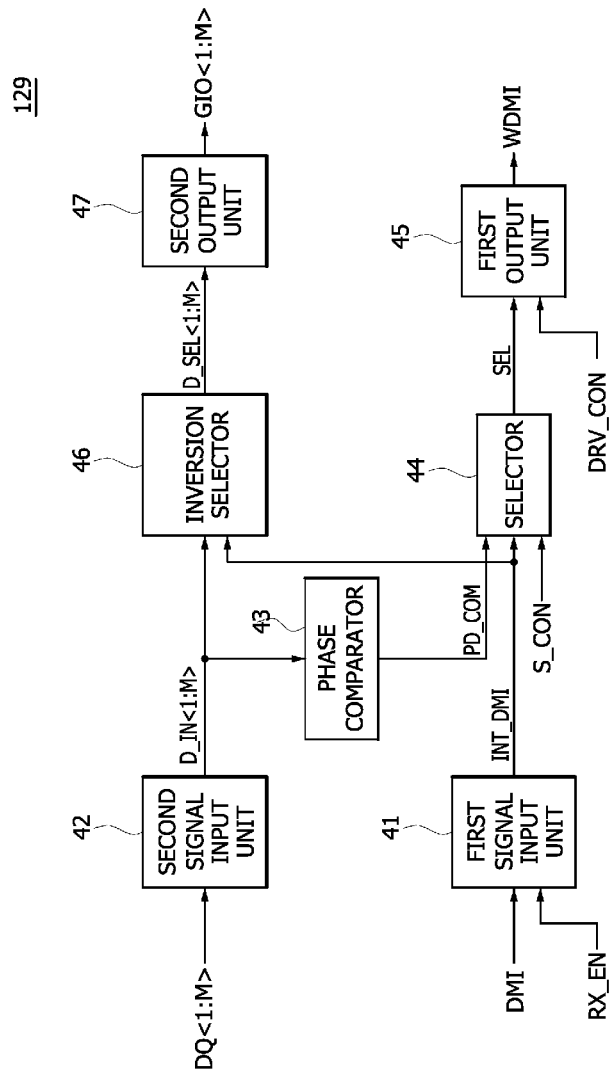
FIG. 4 is a block diagram illustrating a write control circuit included in the semiconductor system of FIG. 1.

Referring to FIG. 4, the write control circuit 129 may include a first signal input unit 41, a second signal input unit 42, a phase comparator 43, a selector 44, a first output unit 45, an inversion selector 46 and a second output unit 47.

The first signal input unit 41 may receive the composite control signal DMI according to the receiver control signal RX_EN to generate an internal composite control signal INT_DMI. The first signal input unit 41 may generate the internal composite control signal INT_DMI from the composite control signal DMI if the receiver control signal RX_EN enabled to have a logic "high" level is inputted thereto. The receiver control signal RX_EN may be generated and enabled to have a logic "high" level if the write operation or the masking write operation is performed while at least one of the first and second mode signals M_DM and M_WDBI is enabled. If the receiver control signal RX_EN disabled to have a logic "low" level is inputted to the first signal input unit 41, the composite control signal DMI may not be inputted to the first signal input unit 41. The receiver control signal RX_EN may be disabled to have a logic "low" level if the write operation or the masking write operation is performed while both of the first and second mode signals M_DM and M_WDBI are disabled. The first signal input unit 41 may be realized to include buffers for buffering input signals and alignment circuits for sequentially aligning the input signals in synchronization with a clock signal generated in the semiconductor device 12.

The second signal input unit 42 may receive the data signals DQ<1:M> to generate internal data signals D_IN<1:M>. The second signal input unit 42 may generate the internal data signals D_IN1<1:M>, D_IN2<1:M>, . . . , and D_INN<1:M> according to the data signals DQ1<1:M>, DQ2<1:M>, . . . , and DQN<1:M> sequentially inputted thereto by the burst operation. The second signal input unit 42 may be configured to include buffers for buffering input signals and alignment circuits for sequentially aligning the input signals in synchronization with the clock signal generated in the semiconductor device 12.

The phase comparator 43 may generate a phase comparison signal PD_COM according to phase variations of the internal data signals D_IN<1:M> sequentially inputted. More specifically, the phase comparator 43 may generate the phase comparison signal PD_COM enabled to have a logic "high" level if the phase variations of the internal data signals D_IN1<1:M>, D_IN2<1:M>, . . . , and D_INN<1:M> sequentially inputted by the burst operation are consistent with a predetermined condition. For example, the phase comparator 43 may be designed to generate the phase comparison signal PD_COM enabled to have a logic "high" level if a logic level combination of four low-order bits D_IN1<1:4> of first internal data signals D_IN1<1:8> inputted to the phase comparator 43 is identical to a logic level combination of four low-order bits D_IN2<1:4> of second internal data signals D_IN2<1:8> inputted to the phase comparator 43 (i.e., D_IN1<1:4>≠D_IN2<1:4>); and a logic level combination of four high-order bits D_IN1<5:8> of the first internal data signals D_IN1<1:8> is different from a logic level combination of four high-order bits D_IN2<5:8> of the second internal data signals D_IN2<1:8> (i.e., D_IN1<5:8>=D_IN2<5:8>). A detailed configuration and a detailed operation of the phase comparator 43 will be described with reference to FIGS. 5 and 6 below. The write control circuit may be configured to execute the DBI operation if the phase variations of the data signals outputted from the controller 12 are different from the predetermined condition.

The selector 44 may selectively output the phase comparison signal PD_COM or the internal composite control signal INT_DMI as a selection signal SEL according to the selection control signal S_CON. The selector 44 may output the phase comparison signal PD_COM as the selection signal SEL if the selection control signal S_CON enabled to have a logic "high" level is inputted. The selection control signal S_CON may be enabled to have a logic "high" level if the write operation or the masking write operation is performed while both of the first and second mode signals M_DM and M_WDBI are enabled. The selector 44 may output the internal composite control signal INT_DMI as the selection signal SEL if the selection control signal S_CON disabled to have a logic "low" level is inputted. The selection control signal S_CON may be disabled to have a logic "low" level if the write operation or the masking write operation is performed while at least one of the first and second mode signals M_DM and M_WDBI is disabled. A detailed configuration and a detailed operation of the selector 44 will be described with reference to FIG. 7 below.

The first output unit 45 may receive the selection signal SEL according to the drive control signal DRV_CON to generate the internal data masking signal WDMI. The first output unit 45 may not receive the selection signal SEL to terminate generation of the internal data masking signal WDMI if the drive control signal DRV_CON enabled to have a logic "high" level is inputted while the first mode signal M_DM is enabled and the second mode signal M_WDBI is disabled. The drive control signal DRV_CON may be enabled to have a logic "high" level if the write operation is performed while the first mode signal M_DM is enabled. The first output unit 45 may receive the selection signal SEL to generate the internal data masking signal WDMI if the drive control signal DRV_CON disabled to have a logic "low" level is inputted. A detailed configuration and a detailed operation of the first output unit 45 will be described with reference to FIG. 8 below.

The inversion selector 46 may determine an inversion or a non-inversion of the internal data signals D_IN<1:M> according to the internal composite control signal INT_DMI to generate selection data signals D_SEL<1:M>. The inversion selector 46 may invert the internal data signals D_IN<1:M> to output the inverted internal data signals as the selection data signals D_SEL<1:M> if the internal composite control signal INT_DMI having a logic "high" level is inputted. The inversion selector 46 may output the internal data signals D_IN<1:M> as the selection data signals D_SEL<1:M> if the internal composite control signal INT_DMI having a logic "low" level is inputted. A detailed configuration and a detailed operation of the inversion selector 46 will be described with reference to FIG. 9 below.

The second output unit 47 may be configured to drive input/output (I/O) lines GIO<1:M> according to the selection data signals D_SEL<1:M>. The second output unit 47 may include a circuit that controls an output sequence of output data according to the burst operation. A detailed configuration and a detailed operation of the second output unit 47 will be described with reference to FIGS. 10 and 11 below.

Figure 5:
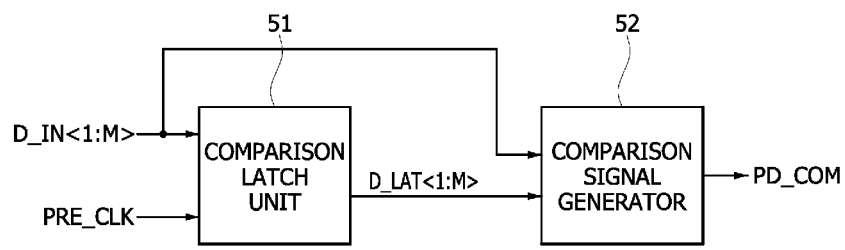
FIG. 5 is a block diagram illustrating a phase comparator included in the write control circuit of FIG. 4.

Referring to FIG. 5, the phase comparator 43 may include a comparison latch unit 51 and a comparison signal generator 52. The comparison latch unit 51 may latch the internal data signals D_IN<1:M> in synchronization with a preliminary clock signal PRE_CLK to generate latched data signals D_LAT<1:M>. The comparison signal generator 52 may compare phases of the internal data signals D_IN<1:M> with phases of the latched data signals D_LAT<1:M> to generate the phase comparison signal PD_COM. For example, if the first internal data signals D_IN1<1:M> and the second internal data signals D_IN2<1:M> are sequentially inputted to the comparison latch unit 51 by the burst operation, the comparison latch unit 51 may latch the first internal data signals D_IN1<1:M> to generate the latched data signals D_LAT<1:M>. Further, the comparison signal generator 52 may compare phases of the second internal data signals D_IN2<1:M> with phases of the latched data signals D_LAT<1:M> to generate the phase comparison signal PD_COM. The phase comparator 43 may compare a phase of each bit of the first internal data signals D_IN1<1:M> with a phase of each bit of the second internal data signals D_IN2<1:M> if the first and second internal data signals D_IN1<1:M> and D_IN2<1:M> are sequentially inputted by the burst operation. Further, the phase comparator 43 may generate the phase comparison signal PD_COM enabled if the comparison result of the phases of the first and second internal data signals D_IN1<1:M> and D_IN2<1:M> is consistent with a predetermined condition.

Figure 6:
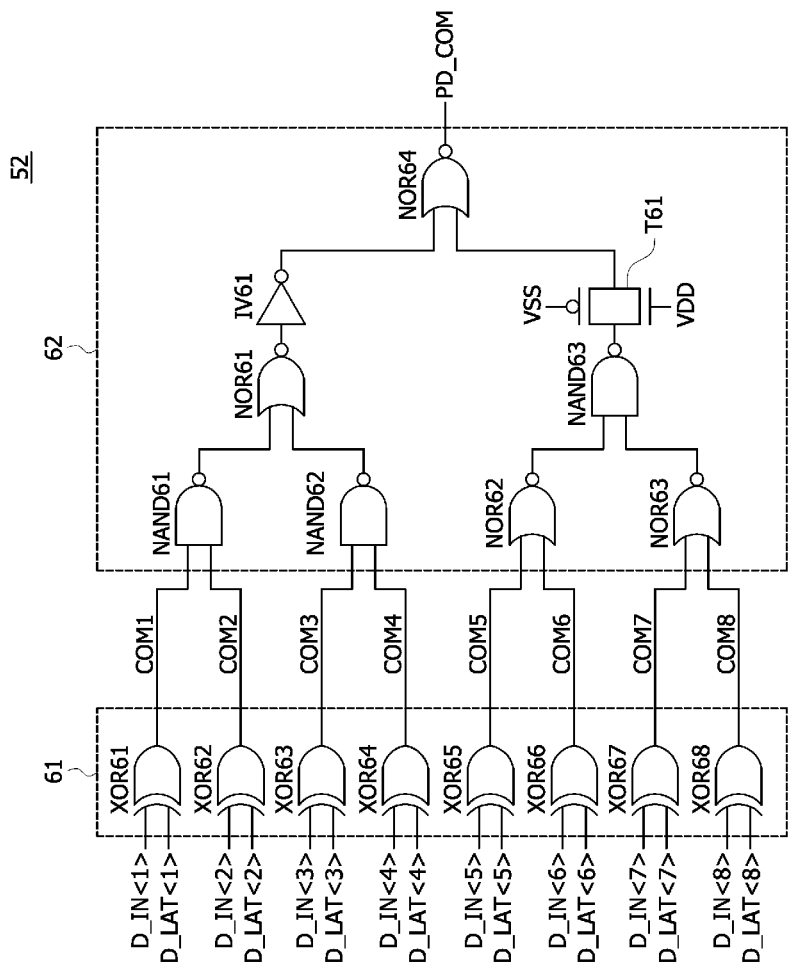
FIG. 6 is a logic circuit diagram illustrating a comparison signal generator included in the phase comparator of FIG. 5.

Referring to FIG. 6, the comparison signal generator 52 may include a comparison synthesizer 61 and a comparison output unit 62. The comparison synthesizer 61 may include a plurality of exclusive OR gates XOR61, XOR62, XOR63, XOR64, XOR65, XOR66, XOR67 and XOR68. The comparison synthesizer 61 may receive the internal data signals D_IN<1:8> and the latched data signals D_LAT<1:8> to execute exclusive OR operations of the internal data signals D_IN<1:8> and the latched data signals D_LAT<1:8>. The comparison synthesizer 61 may compare a phase of each bit of the internal data signals D_IN<1:8> with a phase of each bit of the latched data signals D_LAT<1:8> to generate first to eighth comparison signals COM1~COM8. The first comparison signal COM1 may be generated to have a logic "high" level if a phase of the internal data signal D_IN<1> is different from a phase of the latched data signal D_LAT<1>. Further, the first comparison signal COM1 may be generated to have a logic "low" level if a phase of the internal data signal D_IN<1> is identical to a phase of the latched data signal D_LAT<1>. The second comparison signal COM2 may be generated to have a logic "high" level if a phase of the internal data signal D_IN<2> is different from a phase of the latched data signal D_LAT<2>. In addition, the second comparison signal COM2 may be generated to have a logic "high" level if a phase of the internal data signal D_IN<2> is identical to a phase of the latched data signal D_LAT<2>. The third comparison signal COM3 may be generated to have a logic "high" level if a phase of the internal data signal D_IN<3> is different from a phase of the latched data signal D_LAT<3>. Moreover, the third comparison signal COM3 may be generated to have a logic "high" level if a phase of the internal data signal D_IN<3> is identical to a phase of the latched data signal D_LAT<3>. The fourth comparison signal COM4 may be generated to have a logic "high" level if a phase of the internal data signal D_IN<4> is different from a phase of the latched data signal D_LAT<4>. Further, the fourth comparison signal COM4 may be generated to have a logic "high" level if a phase of the internal data signal D_IN<4> is identical to a phase of the latched data signal D_LAT<4>. The fifth comparison signal COM5 may be generated to have a logic "high" level if a phase of the internal data signal D_IN<5> is different from a phase of the latched data signal D_LAT<5>. In addition, the fifth comparison signal COM5 may be generated to have a logic "high" level if a phase of the internal data signal D_IN<5> is identical to a phase of the latched data signal D_LAT<5>. The sixth comparison signal COM6 may be generated to have a logic "high" level if a phase of the internal data signal D_IN<6> is different from a phase of the latched data signal D_LAT<6>. Further, the sixth comparison signal COM6 may be generated to have a logic "high" level if a phase of the internal data signal D_IN<6> is identical to a phase of the latched data signal D_LAT<6>. The seventh comparison signal COM7 may be generated to have a logic "high" level if a phase of the internal data signal D_IN<7> is different from a phase of the latched data signal D_LAT<7>. In addition, the seventh comparison signal COM7 may be generated to have a logic "high" level if a phase of the internal data signal D_IN<7> is identical to a phase of the latched data signal D_LAT<7>. The eighth comparison signal COM8 may be generated to have a logic "high" level if a phase of the internal data signal D_IN<8> is different from a phase of the latched data signal D_LAT<8>. Further, the eighth comparison signal COM8 may be generated to have a logic "high" level if a phase of the internal data signal D_IN<8> is identical to a phase of the latched data signal D_LAT<8>. The comparison output unit 62 may include a plurality of NAND gates NAND61, NAND62 and NAND63, a plurality of NOR gates NOR61, NOR62, NOR63 and NOR64, an inverter IV61, and a transfer gate T61. The comparison output unit 62 may generate the phase comparison signal PD_COM enabled to have a logic "high" level if logic levels of the first to eighth comparison signals COM1~COM8 are consistent with predetermined logic levels. More specifically, the comparison output unit 62 may generate the phase comparison signal PD_COM enabled to have a logic "high" level if the first to fourth comparison signals COM1~COM4 have a logic "high" level and the fifth to eighth comparison signals COM5~COM8 have a logic "low" level. The comparison output unit 62 may generate the phase comparison signal PD_COM enabled to have a logic "high" level if phases of the internal data signals D_IN<1:4> are respectively different from phases of the latched data signals D_LAT<1:4> and phases of the internal data signals D_IN<5:8> are respectively identical to phases of the latched data signals D_LAT<5:8>.

Figure 7:
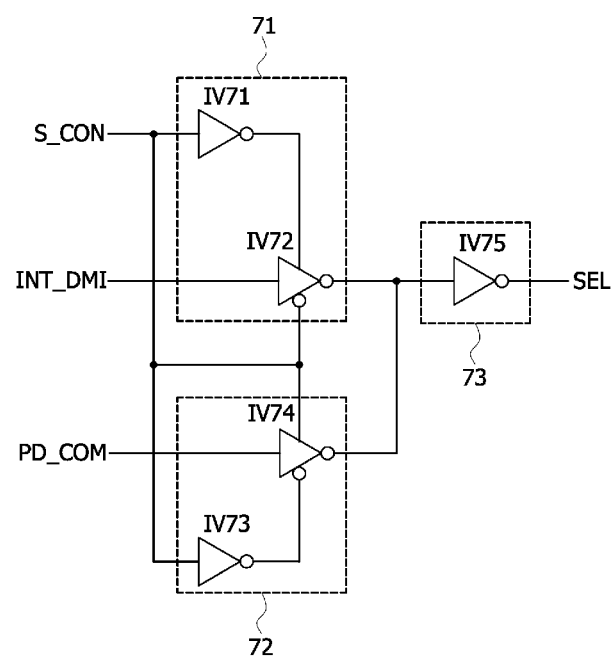
FIG. 7 is a logic circuit diagram illustrating a selector included in the write control circuit of FIG. 4.

Referring to FIG. 7, the selector 44 may include a first transmitter 71, a second transmitter 72 and an inversion unit 73. The first transmitter 71 may include an inverter IV71 and an inverter IV72, and the second transmitter 72 may include an inverter IV73 and an inverter IV74. The inversion unit 73 may include an inverter IV75. The selector 44 may output the internal composite control signal INT_DMI as the selection signal SEL through the first transmitter 71 and the inversion unit 73 if the selection control signal S_CON disabled to have a logic "low" level is inputted thereto. The selection control signal S_CON may be disabled to have a logic "low" level if the write operation or the masking write operation is performed while at least one of the first and second mode signals M_DM and M_WDBI is disabled. The selector 44 may output the phase comparison signal PD_COM as the selection signal SEL through the second transmitter 72 and the inversion unit 73 if the selection control signal S_CON enabled to have a logic "high" level is inputted thereto. The selection control signal S_CON may be enabled to have a logic "high" level if the write operation or the masking write operation is performed while both of the first and second mode signals M_DM and M_WDBI are enabled.

Figure 8:
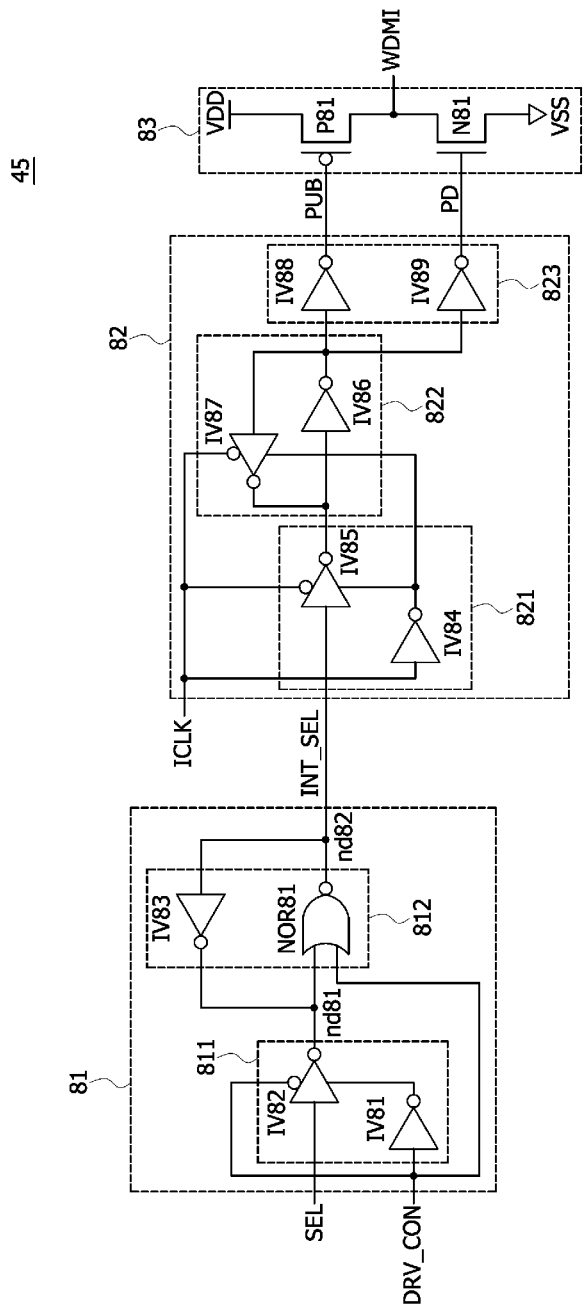
FIG. 8 is a logic circuit diagram illustrating a first output unit included in the write control circuit of FIG. 4.

Referring to FIG. 8, the first output unit 45 may include an input buffer 81, a drive signal generator 82 and a driver 83. The input buffer 81 may include a first input transmitter 811 and a first latch unit 812. The first input transmitter 811 may be configured to include an inverter IV81 and an inverter IV82. The first latch unit 812 may be configured to include a NOR gate NOR81 and an inverter IV83. The input buffer 81 may not receive the selection signal SEL to terminate generation of an internal selection signal INT_SEL if the drive control signal DRV_CON enabled to have a logic "high" level is inputted. The drive control signal DRV_CON may be enabled to have a logic "high" level if the write operation is performed while the first mode signal M_DM is enabled. The input buffer 81 may receive the selection signal SEL to generate the internal selection signal INT_SEL if the drive control signal DRV_CON disabled to have a logic "low" level is inputted thereto. The drive signal generator 82 may include a second input transmitter 821, a second latch unit 822 and a drive signal output unit 823. The second input transmitter 821 may be configured to include an inverter IV84 and an inverter IV85. Further, the second latch unit 822 may be configured to include an inverter IV86 and an inverter IV87. The drive signal output unit 823 may be configured to include an inverter IV88 and an inverter IV89. The drive signal generator 82 may generate a pull-up signal PUB and a pull-down signal PD according to a logic level of the internal selection signal INT_SEL. More specifically, the drive signal generator 82 may generate the pull-up signal PUB having a logic "low" level and the pull-down signal PD having a logic "low" level if the internal selection signal INT_SEL has a logic "high" level. In contrast, the drive signal generator 82 may generate the pull-up signal PUB having a logic "high" level and the pull-down signal PD having a logic "high" level if the internal selection signal INT_SEL has a logic "low" level. The driver 83 may be configured to include a PMOS transistor P81 and an NMOS transistor N81 electrically coupled in series between a power supply voltage VDD terminal and a ground voltage VSS terminal. FIG. 8 also illustrates a node nd81. The driver 83 may generate the internal data masking signal WDMI according to the pull-up signal PUB and the pull-down signal PD. More specifically, the driver 83 may drive the internal data masking signal WDMI to a logic "high" level if the pull-up signal PUB having a logic "low" level and the pull-down signal PD having a logic "low" level are inputted. In contrast, the driver 83 may drive the internal data masking signal WDMI to a logic "low" level if the pull-up signal PUB having a logic "high" level and the pull-down signal PD having a logic "high" level are inputted thereto.

Figure 9:
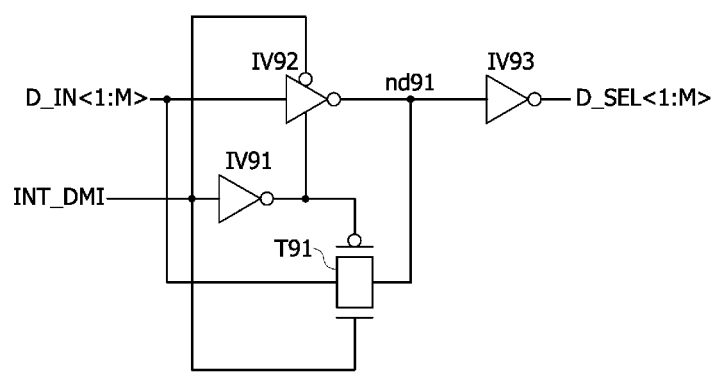
FIG. 9 is a logic circuit diagram illustrating an inversion selector included in the write control circuit of FIG. 4.

Referring to FIG. 9, the inversion selector 46 may include a plurality of inverters IV91, IV92 and IV93 and a transfer gate T91. The inversion selector 46 may transmit the internal data signals D_IN<1:M> to a node ND91 through the transfer gate T91 if the internal composite control signal INT_DMI having a logic "high" level is inputted thereto. Further, the inversion selector 46 may inversely buffer a signal of the node ND91 to output the inversely buffered signal as the selection data signals D_SEL<1:M>. The inversion selector 46 may inversely buffer the internal data signals D_IN<1:M> to transmit the inversely buffered signal of the internal data signals D_IN<1:M> to the node ND91 through the inverter IV92 if the internal composite control signal INT_DMI having a logic "low" level is inputted thereto. Moreover, the inversion selector 46 may inversely buffer a signal of the node ND91 to output the inversely buffered signal of the signal of the node ND91 as the selection data signals D_SEL<1:M>.

Figure 10:
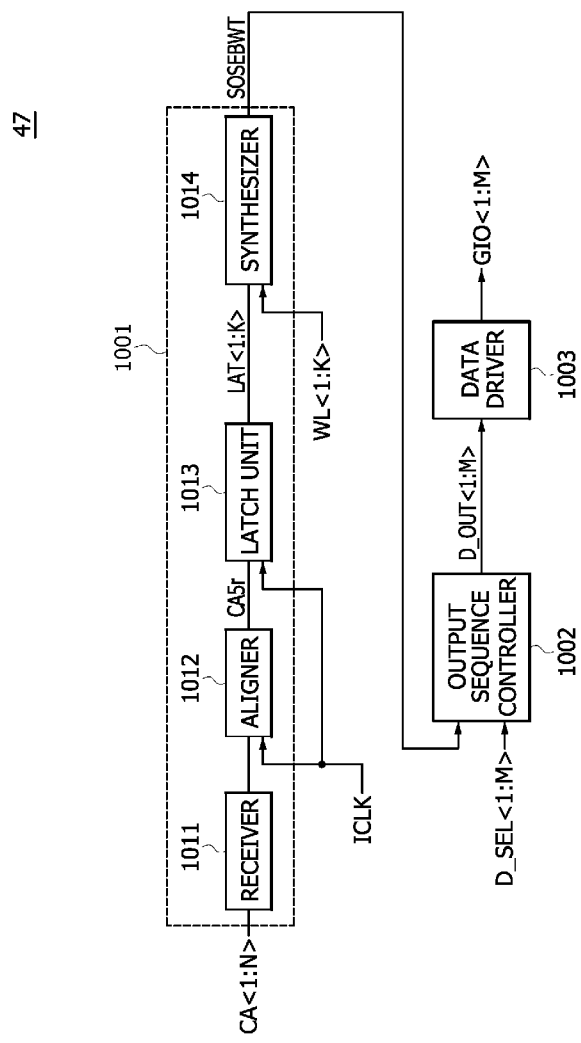
FIG. 10 is a block diagram illustrating a second output unit included in the write control circuit of FIG. 4.

Referring to FIG. 10, the second output unit 47 may include an output control signal generator 1001, an output sequence controller 1002 and a data driver 1003. The output control signal generator 1001 may include a receiver 1011, an aligner 1012, a latch unit 1013 and a synthesizer 1014. The aligner 1012 may receive the command/address signals CA<1: N> through the receiver 1011 to generate an alignment command/address signal CA5r in synchronization with an internal clock signal ICLK. The latch unit 1013 may latch the alignment command/address signal CA5r in synchronization with the internal clock signal ICLK to generate latch signals LAT<1:K>. The synthesizer 1014 may receive the latch signals LAT<1:K> in synchronization with write latency signals WL<1:K> to generate an output control signal SOSEBWT. The write latency signals WL<1:K> may include information on a write latency set by a mode register set operation. The output control signal SOSEBWT may include information on a sequence that the selection data signals D_SEL<1:M> sequentially inputted to the output sequence controller 1002 by the burst operation are outputted from the output sequence controller 1002 as output data signals D_OUT<1:M>. The output control signal SOSEBWT may include burst sequence information. A logic level of the output control signal SOSEBWT according to the burst sequence information may be set to be different according to various embodiments. The output sequence controller 1002 may receive the output control signal SOSEBWT to output the selection data signals D_SEL<1:M> sequentially inputted by the burst operation as the output data signals D_OUT<1:M>. The data driver 1003 may be realized to drive the I/O lines GIO<1:M> according to the output data signals D_OUT<1:M>.

Referring to FIG. 11, an operation of the output sequence controller 1002 according to a logic level of the output control signal SOSEBWT may be understood. First, if the output control signal SOSEBWT has a logic "low" level, the output sequence controller 1002 may output the first selection data signals D_SEL1<1:M> sequentially inputted by the burst operation as the first output data signals D_OUT1<1:M>. Further, the output sequence controller 1002 may output the second selection data signals D_SEL2<1:M> sequentially inputted thereto by the burst operation as the second output data signals D_OUT2<1:M>. In contrast, if the output control signal SOSEBWT has a logic "high" level, the output sequence controller 1002 may output the first selection data signals D_SEL1<1:M> sequentially inputted by the burst operation as the second output data signals D_OUT2<1:M>. In addition, the output sequence controller 1002 may output the second selection data signals D_SEL2<1:M> sequentially inputted thereto by the burst operation as the first output data signals D_OUT1<1:M>. The data driver 1003 may be realized to drive the I/O lines GIO<1:M> according to the second output data signals D_OUT2<1:M> after the I/O lines GIO<1:M> are driven by the first output data signals D_OUT1<1:M>.

Referring to FIG. 12, an operation of the write control circuit 129 according to a logic level combination of the first and second mode signals M_DM and M_WDBI may be understood.

First, if the write operation or the masking write operation is performed while both of the first and second mode signals M_DM and M_WDBI are disabled to have a logic "low" level, the receiver control signal RX_EN may be disabled to have a logic "low" level. If the receiver control signal RX_EN is disabled to have a logic "low" level, the composite control signal DMI may not be inputted to the write control circuit 129.

Next, if the write operation is performed while the first mode signal M_DM is disabled to have a logic "low" level and the second mode signal M_WDBI is enabled to have a logic "high" level, the DBI operation may be performed. While the first mode signal M_DM is disabled to have a logic "low" level, generation of the masking write command signal MWT may be terminated. Accordingly, the masking write operation may not be performed.

Next, if the write operation is performed while the first mode signal M_DM is enabled to have a logic "high" level and the second mode signal M_WDBI is disabled to have a logic "low" level, the drive control signal DRV_CON may be enabled to have a logic "high" level. Generation of the internal data masking signal WDMI may be terminated by the drive control signal DRV_CON enabled to have a logic "high" level. If the masking write operation is performed while the first mode signal M_DM is enabled to have a logic "high" level and the second mode signal M_WDBI is disabled to have a logic "low" level, the internal data masking signal WDMI may be generated from the composite control signal DMI.

Finally, if the write operation or the masking write operation is performed while both of the first and second mode signals M_DM and M_WDBI are enabled to have a logic "high" level, the selection control signal S_CON may be enabled to have a logic "high" level. If the selection control signal S_CON is enabled to have a logic "high" level, the data masking operation or the DBI operation may be selectively performed according to phase variations of the data signals DQ<1:M> sequentially inputted to write control circuit 129 by the burst operation.

Figure 13:
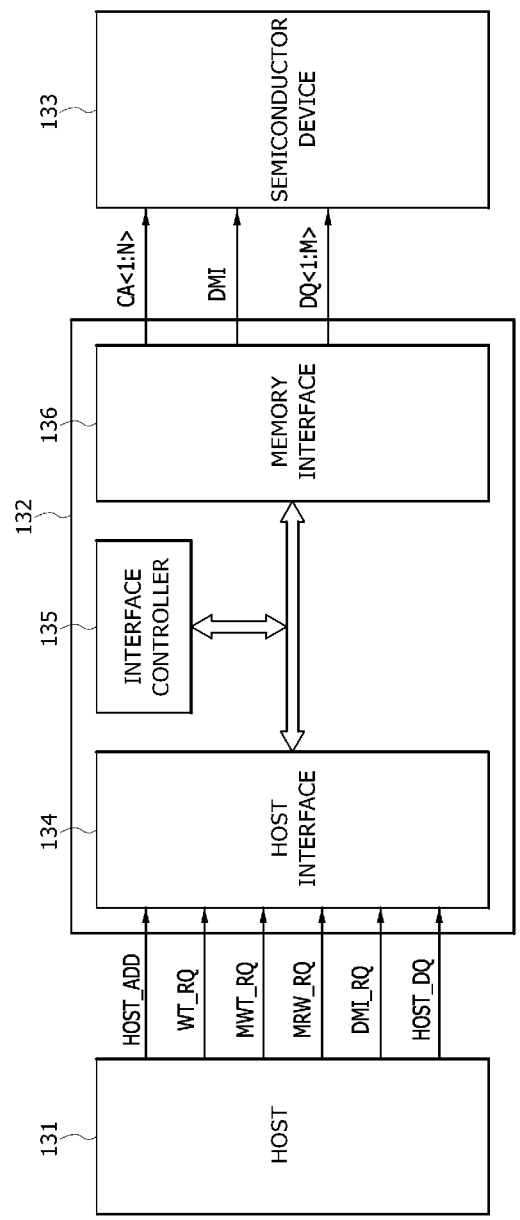
FIG. 13 is a block diagram illustrating a semiconductor system according to an embodiment.

Referring to FIG. 13, a semiconductor system according to an embodiment may include a host 131, a controller 132 and a semiconductor device 133. The controller 132 may include a host interface 134, an interface controller 135 and a memory interface 136. A configuration of the controller 132 may not be limited to FIG. 13. The controller 132 may be realized to be different according to various embodiments. Although FIG. 13 illustrates an example in which the host 131 and the controller 132 are separated from each other, the invention may not be limited thereto. In some embodiments, the controller 132 may be embedded in a processor such as a central processing unit (CPU), an application processor (AP) or a graphic processing unit (GPU) constituting the host 131, or the host 131 and the controller 132 may be embedded in a single chip such as a system on chip (SoC).

The host interface 134 may receive a host address signal HOST_ADD, a write request signal WT_RQ, a masking write request signal MWT_RQ, a mode register write request signal MRW_RQ, a composite control request signal DMI_RQ and a host data signal HOST_DQ from the host 131.

The interface controller 135 may receive the host address signal HOST_ADD from the host interface 134 to map the host address signal HOST_ADD using a reference stored. Further, the interface controller 135 may provide the memory interface 136 with the mapped address. The interface controller 135 may receive the write request signal WT_RQ, the masking write request signal MWT_RQ, the mode register write request signal MRW_RQ and the composite control request signal DMI_RQ from the host interface 134. Further, the interface controller 135 may provide the memory interface 136 with the write request signal WT_RQ, the masking write request signal MWT_RQ, the mode register write request signal MRW_RQ and the composite control request signal DMI_RQ. The interface controller 135 may efficiently control the write request signal WT_RQ, the masking write request signal MWT_RQ, the mode register write request signal MRW_RQ and the composite control request signal DMI_RQ based on a data traffic. The interface controller 135 may realign a provision sequence of the write request signal WT_RQ, the masking write request signal MWT_RQ, the mode register write request signal MRW_RQ and the composite control request signal DMI_RQ in consideration of an operation efficiency. The interface controller 135 may receive the host data signal HOST_DQ from the host interface 134. The interface controller 135 may also provide the memory interface 136 with the host data signal HOST_DQ.

The memory interface 136 may output the mapped address, the write request signal WT_RQ, the masking write request signal MWT_RQ and the mode register write request signal MRW_RQ received from the interface controller 135 as command address signals CA<1: N>. The memory interface 136 may also provide the semiconductor device 133 with the command address signals CA<1: N>. The memory interface 136 may output the composite control request signal DMI_RQ received from the interface controller 135 as a composite control signal DMI. Further, the memory interface 136 may provide the semiconductor device 133 with the composite control signal DMI. The memory interface 136 may output the host data signal HOST_DQ received from the interface controller 135 as data signals DQ<1:M>. Moreover, the memory interface 136 may provide the semiconductor device 133 with the data signals DQ<1:M>.

The semiconductor device 133 may decode command signals included in the command address signals CA<1: N> to generate a mode register write command signal (MRW of FIG. 1). Further, the semiconductor device 133 may generate first and second mode signals (M_DM and M_WDBI of FIG. 1) from the command address signals CA<1: N> according to the mode register write command signal MRW. The semiconductor device 133 may decode the command signals included in the command address signals CA<1: N> to generate a write command signal (WT of FIG. 1) and a masking write command signal (MWT of FIG. 1). The semiconductor device 133 may also execute a write operation or a masking write operation according to the write command signal WT and the masking write command signal MWT. The semiconductor device 133 may receive the composite control signal DMI according to the first and second mode signals M_DM and M_WDBI to control an execution/non-execution of a data masking operation and a DBI operation. The semiconductor device 133 may control the data masking operation as well as the DBI operation according to the composite control signal DMI. Accordingly, the number of pads and pins may be minimized to reduce a chip area of the semiconductor device 133. The semiconductor device 133 may suppress the SSN phenomenon and the ISI phenomenon using a DBI scheme. Further, the semiconductor device 133 may perform a writ operation and a masking write operation in which a burst sequence is reflected.

What is claimed is:

1. A semiconductor system comprising:
   a controller suitable for generating command signals, a composite control signal and data signals; and
   a semiconductor device suitable for generating a first mode signal and a second mode signal according to the command signals,
   wherein the semiconductor device includes a write control circuit suitable for receiving the composite control signal and the data signals to determine an execution/non-execution of a data masking operation and a data bus inversion (DBI) operation when a write operation or a masking write operation is performed according to the first and second mode signals, and
   wherein the write control circuit selectively executes the data masking operation or the DBI operation according to a phase variation of the data signals outputted from the controller if the first mode signal and the second mode signal are enabled.

2. The semiconductor system of claim 1, wherein the first mode signal is enabled to execute the data masking operation and the second mode signal is enabled to execute the DBI operation.

3. The semiconductor system of claim 1, wherein the write control circuit selectively executes the data masking operation or the DBI operation according to phase variations of the data signals sequentially outputted from the controller if the first mode signal, the second mode signal and the composite control signal are enabled.

4. The semiconductor system of claim 1,
   wherein the write control circuit executes the data masking operation if the phase variations of the data signals sequentially outputted from the controller are consistent with a predetermined condition; and
   wherein the write control circuit executes the DBI operation if the phase variations of the data signals sequentially outputted from the controller are different from the predetermined condition.

5. The semiconductor system of claim 1, wherein the write control circuit terminates reception of the composite control signal if the first and second mode signals are disabled.

6. The semiconductor system of claim 1,
   wherein the write control circuit terminates generation of an internal data masking signal for execution of the data masking operation if the write operation is performed while the first mode signal is enabled and the second mode signal is disabled; and
   wherein the write control circuit generates the internal data masking signal from the composite control signal if the masking write operation is performed.

7. The semiconductor system of claim 1,
   wherein the semiconductor device further includes a command decoder suitable for decoding the command signals to generate a write command signal for the write operation, a masking write command signal for the masking write operation, and a mode register write command signal; and
   wherein the command decoder terminates generation of the masking write command signal not to execute the masking write operation if the first mode signal is disabled.

8. The semiconductor system of claim 7, wherein the semiconductor device further includes a mode signal generator suitable for receiving the mode register write command signal to generate the first and second mode signals from the command signals, for storing the first and second mode signals, and for outputting the first and second mode signals.

9. The semiconductor system of claim 1, wherein the write control circuit includes a first signal input unit suitable for receiving the composite control signal according to a receiver control signal to generate an internal composite control signal.

10. The semiconductor system of claim 9, wherein the semiconductor device further includes a receiver controller suitable for generating the receiver control signal which is disabled to terminate reception of the composite control signal if the write operation or the masking write operation is performed while both of the first and second mode signals are disabled.

11. The semiconductor system of claim 9, wherein the write control circuit further includes a selector suitable for selectively outputting the internal composite control signal or a phase comparison signal as a selection signal according to a selection control signal.

12. The semiconductor system of claim 11, wherein the semiconductor device further includes a selection controller suitable for generating the selection control signal to selectively execute the data masking operation or the DBI operation according to a phase variation of the data signals sequentially outputted from the controller if the first and second mode signals and the composite control signal are enabled.

13. The semiconductor system of claim 11, wherein the write control circuit further includes a first output unit suitable for receiving the selection signal according to a drive control signal to drive an internal data masking signal.

14. The semiconductor system of claim 13, wherein the first output unit includes:
  an input buffer suitable for receiving and latching the selection signal according to the drive control signal to generate an internal selection signal;
  a drive signal generator suitable for receiving and latching the internal selection signal according to an internal clock signal and for buffering the internal selection signal to generate a pull-up signal and a pull-down signal; and
  a driver suitable for driving the internal data masking signal according to the pull-up signal and the pull-down signal.

15. The semiconductor system of claim 13, wherein the semiconductor device further includes a drive controller suitable for generating the drive control signal to terminate generation of the internal data masking signal for execution of the data masking operation if the write operation is performed while the first mode signal is enabled and the second mode signal is disabled.

16. The semiconductor system of claim 13, wherein the write control circuit further includes:
  a second signal input unit suitable for receiving the data signals to generate internal data signals; and
  a phase comparator suitable for latching the internal data signals to generate latched data signals and for comparing phases of the internal data signals with phases of the latched data signals to generate the phase comparison signal.

17. The semiconductor system of claim 16, wherein the second signal input unit is suitable for sequentially generating first internal data signals and second internal data signals from the data signals.

18. The semiconductor system of claim 17, wherein the phase comparator is suitable for latching the first internal data signals to generate the latched data signals and for comparing a phase of the latched data signals with a phase of bits included in the second internal data signals to generate the phase comparison signal.

19. The semiconductor system of claim 16, wherein the write control circuit further includes:
  an inversion selector suitable for determining an inversion or a non-inversion of the internal data signals according to the internal composite control signal to generate selection data signals; and
  a second output unit suitable for driving input/output (I/O) lines according to the selection data signals.

20. A semiconductor device comprising:
  a command decoder suitable for decoding command signals to generate a write command signal for a write operation, a masking write command signal for a masking write operation, and a mode register write command signal;
  a mode signal generator suitable for receiving the mode register write command signal to generate a first mode signal and a second mode signal from the command signals, for storing the first and second mode signals, and for outputting the first and second mode signals; and
  a write control circuit suitable for receiving a composite control signal and data signals to determine an execution/non-execution of a data masking operation and a data bus inversion (DBI) operation when the write operation or the masking write operation is performed according to the first and second mode signals,
  wherein the write control circuit selectively executes the data masking operation or the DBI operation according to a phase variation of the data signals outputted from a controller if the first mode signal and the second mode signal are enabled.

21. The semiconductor device of claim 20, wherein the command decoder terminates generation of the masking write command signal not to execute the masking write operation if the first mode signal is disabled.

22. The semiconductor device of claim 20, wherein the write control circuit includes a first signal input unit suitable for receiving the composite control signal according to a receiver control signal to generate an internal composite control signal.

23. The semiconductor device of claim 22, further comprising:
  a receiver controller suitable for generating the receiver control signal which is disabled to terminate reception of the composite control signal if the write operation or the masking write operation is performed while the first and second mode signals are disabled.

24. The semiconductor device of claim 22, wherein the write control circuit further includes a selector suitable for selectively outputting the internal composite control signal or a phase comparison signal as a selection signal according to a selection control signal.

25. The semiconductor device of claim 24, further comprising:
  a selection controller suitable for generating the selection control signal to selectively execute the data masking operation or the DBI operation according to a phase variation of data signals sequentially outputted from a controller if first and second mode signals and the composite control signal are enabled.

26. The semiconductor device of claim 24, wherein the write control circuit further includes a first output unit suitable for receiving the selection signal according to a drive control signal to drive an internal data masking signal.

27. The semiconductor device of claim 26, wherein the first output unit includes:
  an input buffer suitable for receiving and latching the selection signal according to the drive control signal to generate an internal selection signal;
  a drive signal generator suitable for receiving and latching the internal selection signal according to an internal clock signal and for buffering the internal selection signal to generate a pull-up signal and a pull-down signal; and
  a driver suitable for driving the internal data masking signal according to the pull-up signal and the pull-down signal.

28. The semiconductor device of claim 26, further comprising:
 a drive controller suitable for generating the drive control signal to terminate generation of the internal data masking signal for execution of the data masking operation if the write operation is performed while the first mode signal is enabled and the second mode signal is disabled.

29. The semiconductor device of claim 26, wherein the write control circuit further includes:
 a second signal input unit suitable for receiving the data signals to generate internal data signals; and
 a phase comparator suitable for latching the internal data signals to generate latched data signals and for comparing phases of the internal data signals with phases of the latched data signals to generate the phase comparison signal.

30. The semiconductor device of claim 29, wherein the second signal input unit is suitable for sequentially generating first internal data signals and second internal data signals from the data signals.

31. The semiconductor device of claim 30, wherein the phase comparator is suitable for latching the first internal data signals to generate the latched data signals and for comparing a phase of the latched data signals with a phase of bits included in the second internal data signals to generate the phase comparison signal.

32. The semiconductor device of claim 29, wherein the write control circuit further includes:
 an inversion selector suitable for determining an inversion or a non-inversion of the internal data signals according to the internal composite control signal to generate selection data signals; and
 a second output unit suitable for driving input/output (I/O) lines according to the selection data signals.

* * * * *